United States Patent
Gardner et al.

(10) Patent No.: US 11,560,909 B2
(45) Date of Patent: Jan. 24, 2023

(54) ACCESSORY ATTACHMENT MECHANISM

(71) Applicant: GM GLOBAL TECHNOLOGY OPERATIONS LLC, Detroit, MI (US)

(72) Inventors: Alexander Gardner, Royal Oak, MI (US); John D. Taylor, Royal Oak, MI (US); Sean S. Lincoln, Berkley, MI (US); Matthew Simonin, Ortonville, MI (US); Kurt Baldauf, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 17/246,965

(22) Filed: May 3, 2021

(65) Prior Publication Data

US 2022/0349432 A1 Nov. 3, 2022

(51) Int. Cl.
*F16B 2/18* (2006.01)
*F16B 2/04* (2006.01)
*B60R 11/00* (2006.01)

(52) U.S. Cl.
CPC ............. *F16B 2/185* (2013.01); *B60R 11/00* (2013.01); *F16B 2/04* (2013.01); *B60R 2011/0059* (2013.01)

(58) Field of Classification Search
CPC .............. Y10T 403/76; Y10T 403/595; Y10T 403/7071; Y10T 403/75; Y10T 24/44026; Y10T 24/44709; Y10T 24/28; F16B 2/185; F16B 2/04; F16B 2/02
USPC ....................................... 403/409.1
See application file for complete search history.

(56) References Cited

U.S. PATENT DOCUMENTS

| | | | | |
|---|---|---|---|---|
| 3,574,367 | A * | 4/1971 | Jankowski | B62D 33/044 403/201 |
| 4,549,832 | A * | 10/1985 | Sterl | F16B 7/0473 403/264 |
| 4,693,630 | A * | 9/1987 | Giovannetti | F16B 7/046 403/231 |
| 2016/0208836 | A1* | 7/2016 | Sint Nicolaas | F16B 2/04 |

* cited by examiner

*Primary Examiner* — Robert Sandy
(74) *Attorney, Agent, or Firm* — Quinn IP Law

(57) ABSTRACT

An attachment mechanism including a first clamp member having a V-shaped first clamping end and a second clamp member having a V-shaped second clamping end and an adjustment mechanism configured to adjust a relative position of the first clamp member and the second clamp member. The first and second clamp members are configured to translate toward and away from each other via force exerted by the adjustment mechanism such that the first and second clamping ends translate between an engaged and a disengaged position.

20 Claims, 8 Drawing Sheets

ACCESSORY ATTACHMENT MECHANISM

INTRODUCTION

The present disclosure relates generally to an attachment mechanism for vehicle accessories.

Vehicle accessories are typically clamped into a pickup box with a metal on metal interface that relies on the operator to input the correct torque. Thus, there is a need for an easy to use accessory platform that can simplify the installation of an accessory within a pickup box.

SUMMARY

Embodiments according to the present disclosure provide a number of advantages. For example, embodiments according to the present disclosure enable a quick attachment of an accessory to surfaces of varying thicknesses, such as the surfaces of a pickup bed.

In one aspect of the present disclosure, an attachment mechanism includes a first clamp member having a V-shaped first clamping end and a second clamp member having a V-shaped second clamping end and an adjustment mechanism configured to adjust a relative position of the first clamp member and the second clamp member. The first and second clamp members are configured to translate toward and away from each other via force exerted by the adjustment mechanism such that the first and second clamping ends translate between an engaged and a disengaged position.

In some aspects, the attachment mechanism further includes a housing and a back plate coupled to the housing and having an opening therethrough. Each of the first clamping end and the second clamping end extend through the opening in the back plate and the V-shapes of the first and second clamping ends engage an interfacing component when in the engaged position.

In some aspects, the attachment mechanism further includes a first tapered member, a second tapered member, and a load bearing surface. The first and second tapered members accommodate a varied thickness of the interfacing component and are configured to translate in opposite directions relative to one another and frictionally engage and clamp an interfacing component against the load bearing surface of the attachment mechanism.

In some aspects, the adjustment mechanism is a pair of preloaded compression members.

In some aspects, the attachment mechanism further includes a linkage assembly. The adjustment mechanism includes at least one preloaded compression member such that expansion of the linkage assembly against a force of the at least one preloaded compression member expands the first and second clamp members away from each other such that the first and second clamp members engage an interfacing component.

In some aspects, the linkage assembly is a four-bar linkage that couples together the first and second clamp members.

In some aspects, the attachment mechanism further includes a lever. Rotation of the lever in a first direction expands the linkage assembly such that the first and second clamp members are in the engaged position and rotation of the lever in a second direction opposite the first direction contracts the linkage assembly such that the first and second clamp members are in the disengaged position.

In some aspects, the attachment mechanism further includes a latching assembly coupled to the lever via a coupling member. The latching assembly is configured to releasably secure the linkage assembly to position the attachment mechanism between the engaged and the disengaged position.

In some aspects, the attachment mechanism further includes a housing, a back plate coupled to the housing and having an opening therethrough, and a cam enclosed within the housing. The cam is configured to act on the first and second clamp members to position the first and second clamp members in the engaged position with an interfacing component.

In some aspects, the first clamp member has a first body enclosed within the housing, the first body including a recessed area that receives a first pad member, the second clamp member has a second body enclosed within the housing, the second body including a recessed area that receives a second pad member, and the cam rotates against the first and second pad members to enable smooth rotation of the cam to position the first and second clamping ends between the engaged and disengaged positions.

In some aspects, the first body includes a first edge that defines a first slot, a second edge that defines a second slot, a first pin configured to translate within the first slot, a second pin configured to translate within the second slot and wherein the second body includes a third edge that defines a third slot, a fourth edge that defines a fourth slot, a third pin configured to translate within the third slot, and a fourth pin configured to translate within the fourth slot, such that the first, second, third, and fourth pins maintain the position of the first and second bodies within the housing and the first, second, third, and fourth slots are aligned with a direction of movement of the first and second clamping ends and limit a translational movement of the first and second clamping ends.

In another aspect of the present disclosure, an attachment mechanism includes a housing, a back plate coupled to the housing and having an opening therethrough, a first clamp member and a second clamp member at least partially enclosed within the housing, the first clamp member having a first clamping end and the second clamp member having a second clamping end, and a cam enclosed within the housing, the cam configured to act on the first and second clamp members. Each of the first clamping end and the second clamping end have an outward-facing V-shape and extend through the opening in the back plate. The first and second clamp members are configured to translate toward and away from each other via force exerted by the cam such that the outward-facing V-shapes of the first and second clamping ends translate between an engaged and a disengaged position.

In some aspects, the first clamp member has a first body enclosed within the housing, the first body including a recessed area that receives a first pad member, the second clamp member has a second body enclosed within the housing, the second body including a recessed area that receives a second pad member, and the cam rotates against the first and second pad members to enable smooth rotation of the cam to position the first and second clamping ends between the engaged and disengaged positions.

In some aspects, the first body includes a first edge that defines a first slot, a second edge that defines a second slot, a first pin configured to translate within the first slot, a second pin configured to translate within the second slot and wherein the second body includes a third edge that defines a third slot, a fourth edge that defines a fourth slot, a third pin configured to translate within the third slot, and a fourth pin configured to translate within the fourth slot, such that the first, second, third, and fourth pins maintain the position of the first and second bodies within the housing.

In some aspects, the first, second, third, and fourth slots are aligned with a direction of movement of the first and second clamping ends and limit a translational movement of the first and second clamping ends.

In some aspects, the attachment mechanism further includes a first tension member and a second tension member. The first and second tension members are preloaded to bias the first and second clamping ends of the first and second clamp members in the disengaged position.

In another aspect of the present disclosure, an attachment mechanism includes a housing, a shaft enclosed by the housing and coupled to a crank, the shaft including a plurality of ratchet teeth extending radially outward from the shaft, a clutch member having a plurality of clutch teeth extending radially inward and toward the ratchet teeth, a compression member configured to act against the clutch member to dispose the plurality of clutch teeth against the plurality of ratchet teeth, and a load bearing surface coupled to the shaft. Rotation of the shaft by the crank engages the plurality of ratchet teeth with the plurality of clutch teeth to allow the load bearing surface to be adjusted between an engaged and a disengaged position.

In some aspects, in the engaged position, the load bearing surface clamps the attachment mechanism to an interfacing component.

In some aspects, the attachment mechanism further includes a tensioning member configured to adjust a clamp load of the attachment mechanism.

In some aspects, the compression member includes a first compression member positioned orthogonal to the shaft and a second compression member positioned orthogonal to the shaft.

BRIEF DESCRIPTION OF THE DRAWINGS

The present disclosure will be described in conjunction with the following figures, wherein like numerals denote like elements.

Figure 2:
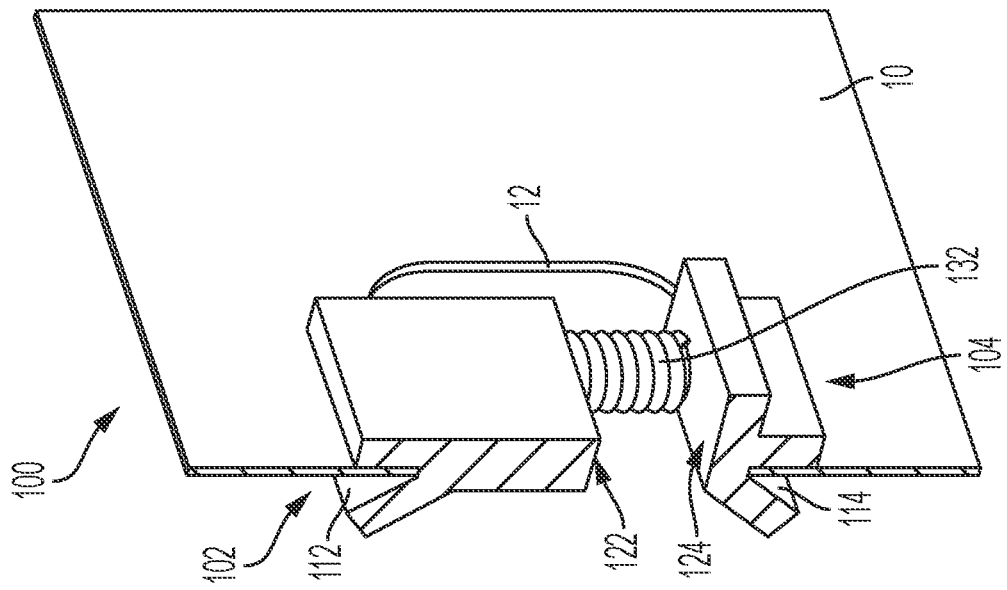
FIG. 2 is a schematic cross-sectional perspective view of the attachment system of FIG. 1.

The foregoing and other features of the present disclosure will become more fully apparent from the following description and appended claims; taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Attaching an accessory to a pickup box typically involves clamping the metal together and the operator must input the correct torque. The embodiments discussed herein change the direction in which the device clamps such that the clamping force is applied by expanding the clamp through the hole. This ensures a consistent load and maximum bearing surface when the clamping interface is pulled directly outward from its surface. Various embodiments incorporate a "V" shaped design to accommodate variations in material thickness at the point of attachment. The embodiments discussed herein provide a common attachment method for accessories or other components to be attached at attachment points having varying material thicknesses.

Figure 1:
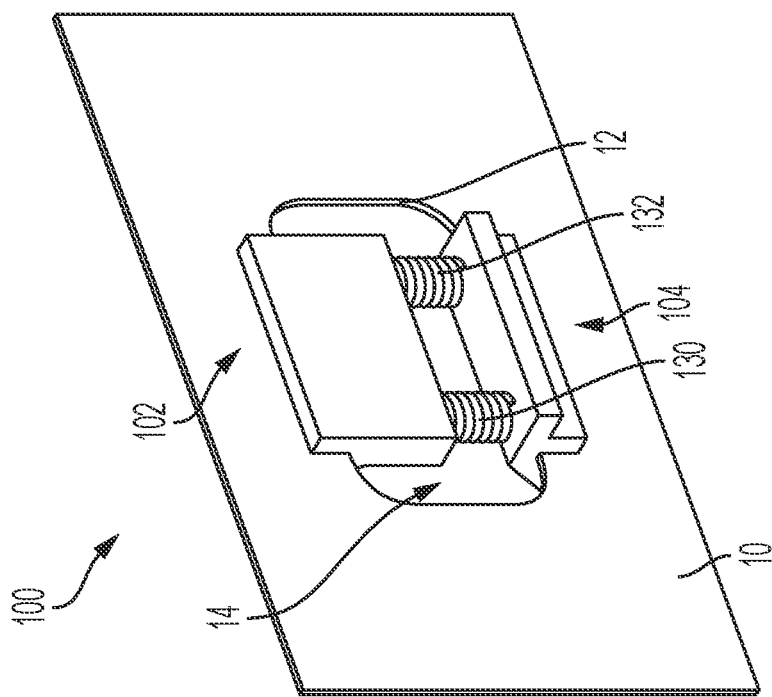
FIG. 1 is a schematic perspective view of an attachment system, according to an embodiment.

FIGS. 1 and 2 illustrate a "V" shaped attachment mechanism 100, according to an embodiment. The attachment mechanism 100 includes a first clamp member 102 and a second clamp member 104. The first clamp member 102 includes a first clamping end 112 having an outward facing V-shape and the second clamp member 104 includes a second clamping end 114 similarly having an outward facing V-shape.

The first clamp member 102 includes a first connection surface 122 located at the opposite end of the first clamp member 102 from the first clamping end 112. Similarly, the second clamp member 104 includes a second connection surface 124 located at the opposite end of the second clamp member 104 from the second clamping end 114.

In various embodiments, the first and second clamp members 102, 104 are connected with a clamp adjustment mechanism. In the embodiment illustrated in FIGS. 1 and 2, the first and second clamp members 102, 104 are connected with a first adjustment mechanism 130 and a second adjustment mechanism 132. In the illustrated embodiment, the first and second adjustment mechanisms 130, 132 are preloaded compression members such as springs. The first and second adjustment mechanisms 130, 132 enable the first and second clamp members 102, 104 to move between an engaged position and a disengaged position. In various embodiments, the adjustment mechanisms 130, 132 enable the first and second clamp members 102, 104 to contract or disengage (that is, move towards each other) to fit within the opening 14 defined by an edge 12 in a component 10 and expand or engage (that is, move away from each other) such that the first and second clamping ends 112, 114 engage with the edge 12 of the opening 14.

Figure 5:
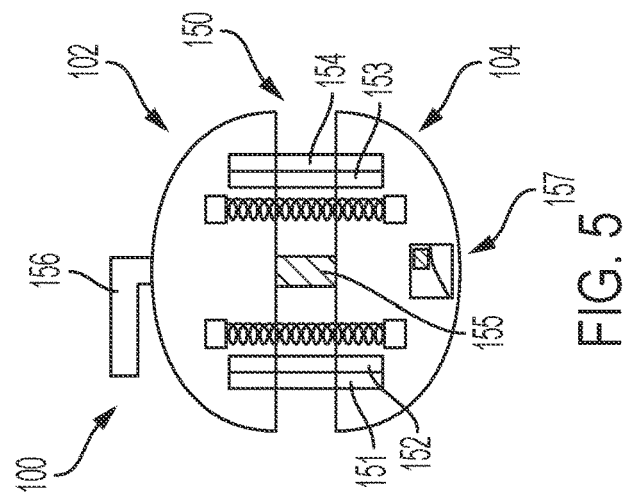
FIG. 5 is a schematic rear view of the attachment system of FIG. 3.
Figure 4:
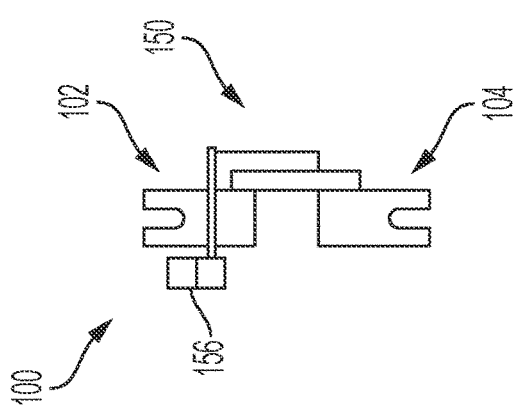
FIG. 4 is a schematic side view of the attachment system of FIG. 3.
Figure 3:
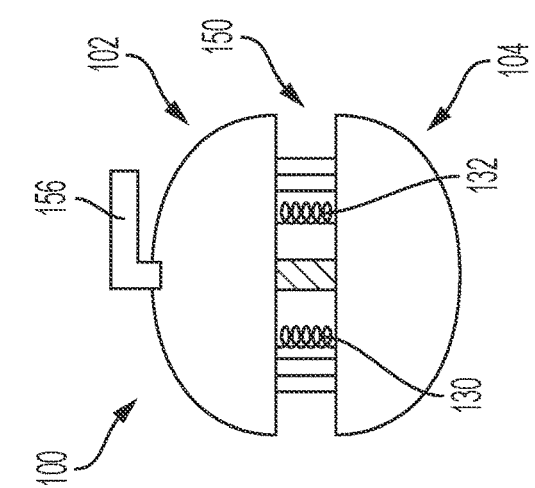
FIG. 3 is a schematic front view of an attachment system including a linkage assembly, according to an embodiment.

In various embodiments, the first and second clamp members 102, 104 are connected by a linkage assembly 150, such as a four-bar linkage, as shown in front, side, and rear views, respectively, in FIGS. 3-5. The attachment mechanism 100 includes first and second clamp members 102, 104 pretensioned by the first and second adjustment mechanisms 130, 132, shown as springs. The linkage assembly 150 of the attachment mechanism 100 further includes a first link member 151, a second link member 152, a third link member 153, and a fourth link member 154. The first, second, third, and fourth link members 151, 152, 153, 154 couple the first and second clamp members 102, 104 and allow the first and second clamp members 102, 104 to move towards and away from each other (that is, between the engaged and disengaged positions). A coupling member 155 connects a lever 156 with a latching assembly 157.

Rotation of the lever 156 in a first direction causes the linkage assembly 150 to expand against the pretensioned force of the first and second adjustment mechanisms 130, 132 such that the first and second clamp members 102, 104 engage with edges of an opening, as shown in FIGS. 1 and 2. Rotation of the lever 156 in a second direction opposite the first direction causes the linkage assembly 150 to contract and pull the first and second adjustment mechanism 130, 132 away from the edges of the opening to release the attachment mechanism 100. In various embodiments, the latching assembly 157 allows the linkage assembly 150 to be releasably secured to position the attachment mechanism 100 between the engaged and disengaged positions.

Figure 8:
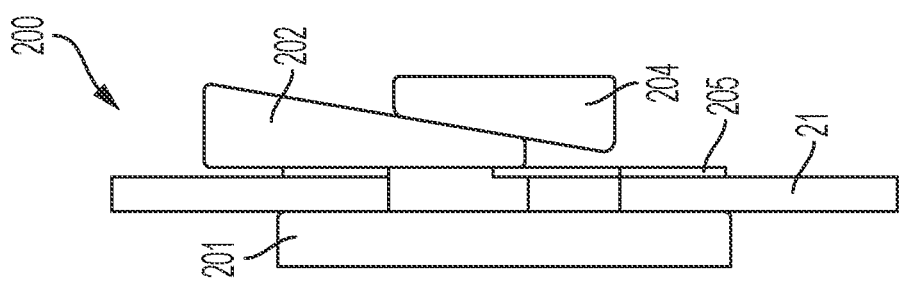
FIG. 8 is a schematic cross-sectional view of the attachment system of FIG. 6, coupling together a second variation of thicknesses of a base component and interfacing component.
Figure 7:
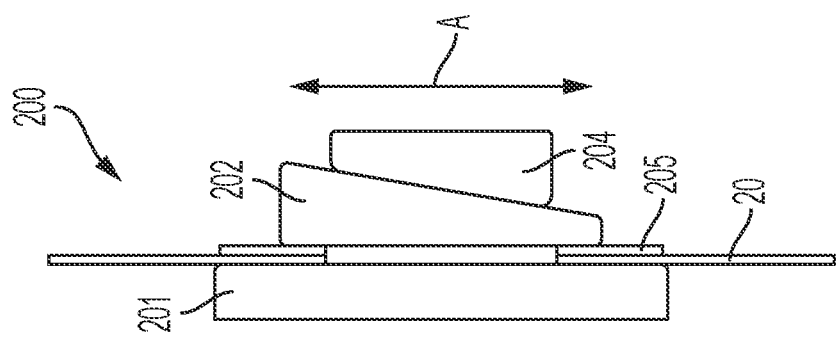
FIG. 7 is a schematic cross-sectional view of the attachment system of FIG. 6, coupling together two different thicknesses.
Figure 6:
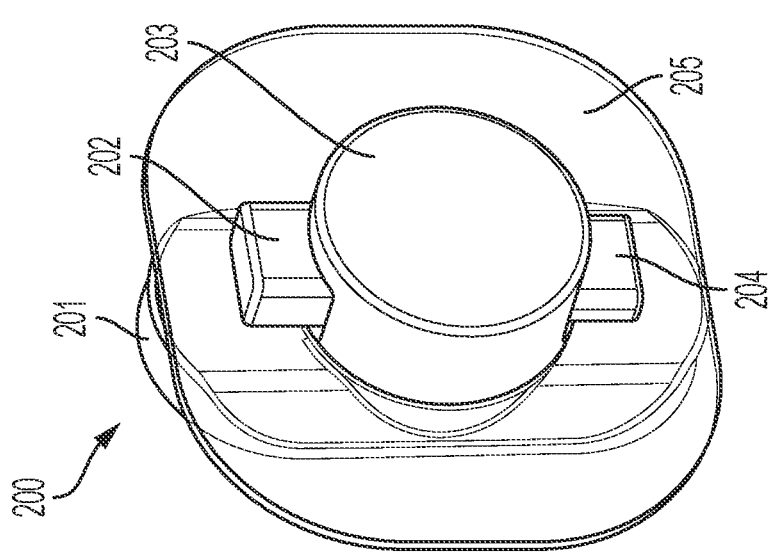
FIG. 6 is a schematic perspective front view of an attachment system, according to another embodiment.
Figure 9:
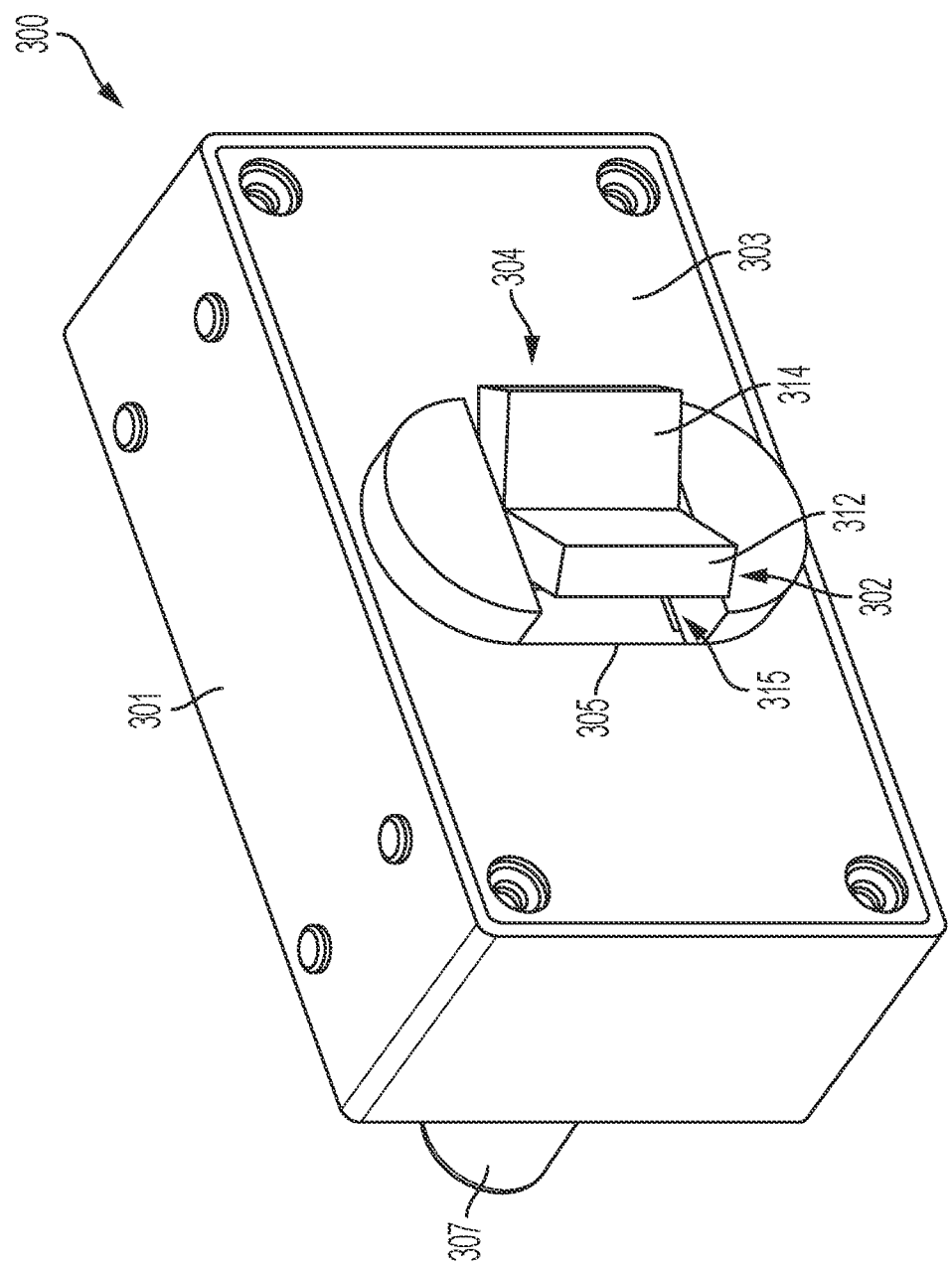
FIG. 9 is a schematic perspective rear view of an attachment system, according to another embodiment.

FIGS. 6-8 illustrate an attachment mechanism 200, according to another embodiment. The attachment mechanism 200 is a mortice-tenon-style attachment mechanism that can accommodate multiple thicknesses of components when attaching an accessory. The attachment mechanism 200 includes a first body member 201 and a second body member 203. The first body member 201 is configured to be larger than the opening in the component to which the attachment mechanism 200 is connected. The second body member 203 at least partially encloses a first tapered member 202 and a second tapered member 204. The first and second tapered members 202, 204 are configured to translate in opposite directions relative to one another (as indicated by the arrow A) to accommodate the thickness of the interfacing component. As shown in FIG. 7, the first and second tapered members 202, 204 are in a first configuration to accommodate an interfacing component 20 having a first, or narrow, width. In FIG. 8, the first and second tapered members 202, 204 are in a second configuration to accommodate an interfacing component 21 having a second, or wide, width. The attachment mechanism 200 further includes a plate 205 against which the first and second tapered members 202, 204 act to clamp together the accessory with the interfacing part via first and second clamp members, such as the first and second clamp members 102, 104 shown in FIGS. 1 and 2.

Figure 10:
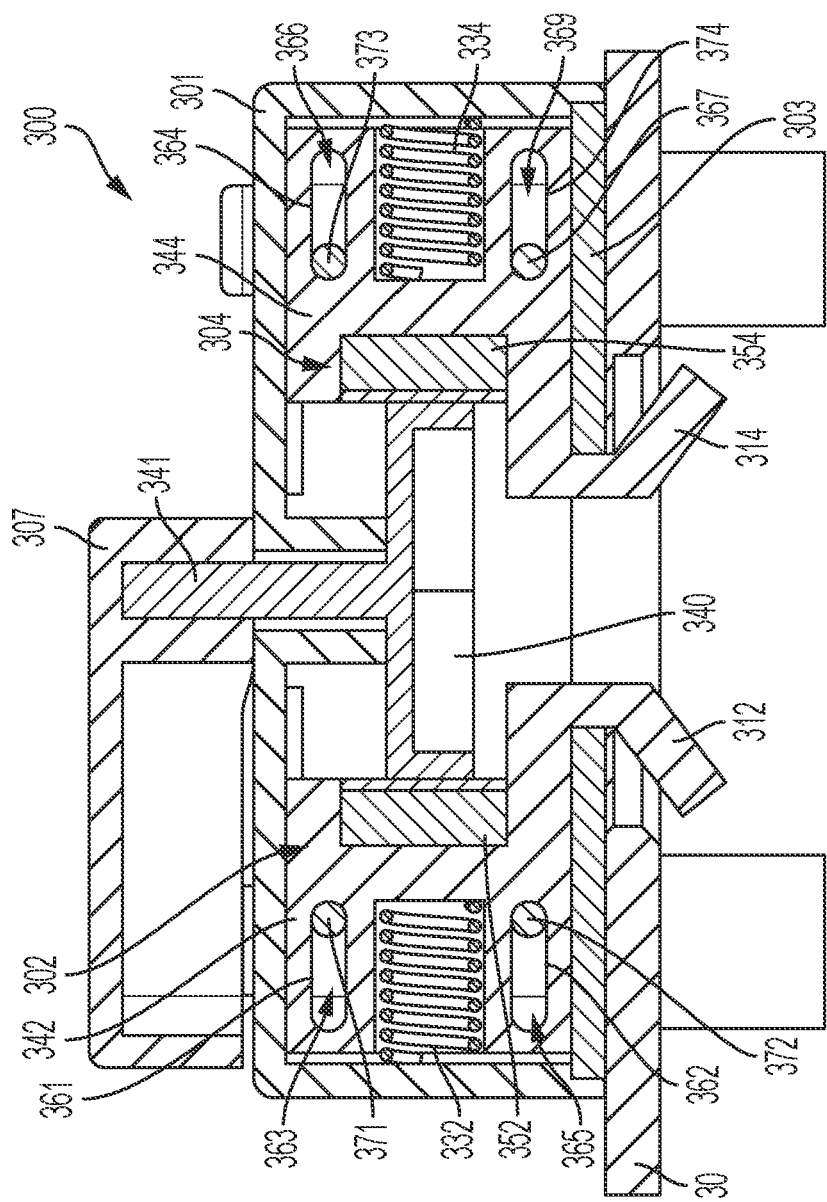
FIG. 10 is a schematic cross-sectional plan view of the attachment system of FIG. 9.

Another embodiment of an attachment mechanism 300 is illustrated in FIGS. 9-12. In this embodiment, the attachment mechanism 300 includes a housing 301. The housing also includes a back plate 303 having an edge 305 defining an opening 315. A first clamp member 302 and a second clamp member 304 are at least partially enclosed within the housing 301. The first clamp member 302 includes a first clamping end 312 having an outward facing V-shape and the second clamp member 304 includes a second clamping end 314 similarly having an outward facing V-shape. The first and second clamping ends 312, 214 extend through the opening 315 in the back plate 303 of the housing 301. A handle 307 enables the operator to release and engage the first and second clamping ends 312, 314 with an interfacing surface, as shown in FIG. 10.

As shown in FIG. 10, illustrating a cross-sectional plan view of the attachment mechanism 300, the housing 301 encloses a cam 340 coupled with a shaft 341. The shaft 341 extends at least partially outside the housing 301 and is coupled with the handle 307 such that rotation of the handle 307 rotates the cam 340.

The first clamp member 302 includes a body 342 that is enclosed within the housing 301 and, as discussed above, a first clamping end 312 that extends out of the housing 301. Similarly, the second clamp member 304 includes a body 344 that is enclosed with the housing 301 and a second clamping end 314 that extends out of the housing 301. The body 342 includes a recessed area that receives a pad member 352 and the body 344 includes a recessed area that receives a pad member 354. The pad members 352, 354 enable smooth rotation of the cam 340 to engage and disengage the first and second clamping ends 312, 314, as discussed herein. The body 342 may be referred to as the first body, and the body 344 may be referred to as the second body.

The body 342 also includes a first edge 361 that defines a first slot 363 and a second edge 362 that defines a second slot 365. Similarly, the body 344 also includes a first edge 364 that defines a first slot 366 and a second edge 367 that defines a second slot 369. The slots 363, 365, 366, 369 are generally horizontal and aligned with a direction of movement of the first and second clamping ends 312, 314 between the engaged and disengaged positions. A first pin 371 translates within the first slot 363 in the body 342, a second pin 372 translates within the second slot 365 in the body 342, a third pin 373 translates within the first slot 366 in the body 344, and a fourth pin 374 translates within the second slot 369 in the body 344. The first, second, third, and fourth pins 371, 372, 373, 374 maintain the positions of the bodies 342, 344 within the housing 301.

A first tension member 332 is received within the body 342 of the first clamp member 302 and a second tension member 334 is received within the body 344 of the second clamp member 304. The first and second tension members 332, 342 are oriented generally horizontal and parallel to the slots 363, 365, 366, 369. The first and second tension members 332, 334 are preloaded to bias the first and second clamping ends 312, 314 in a disengaged position, as shown in FIG. 11.

Figure 12:
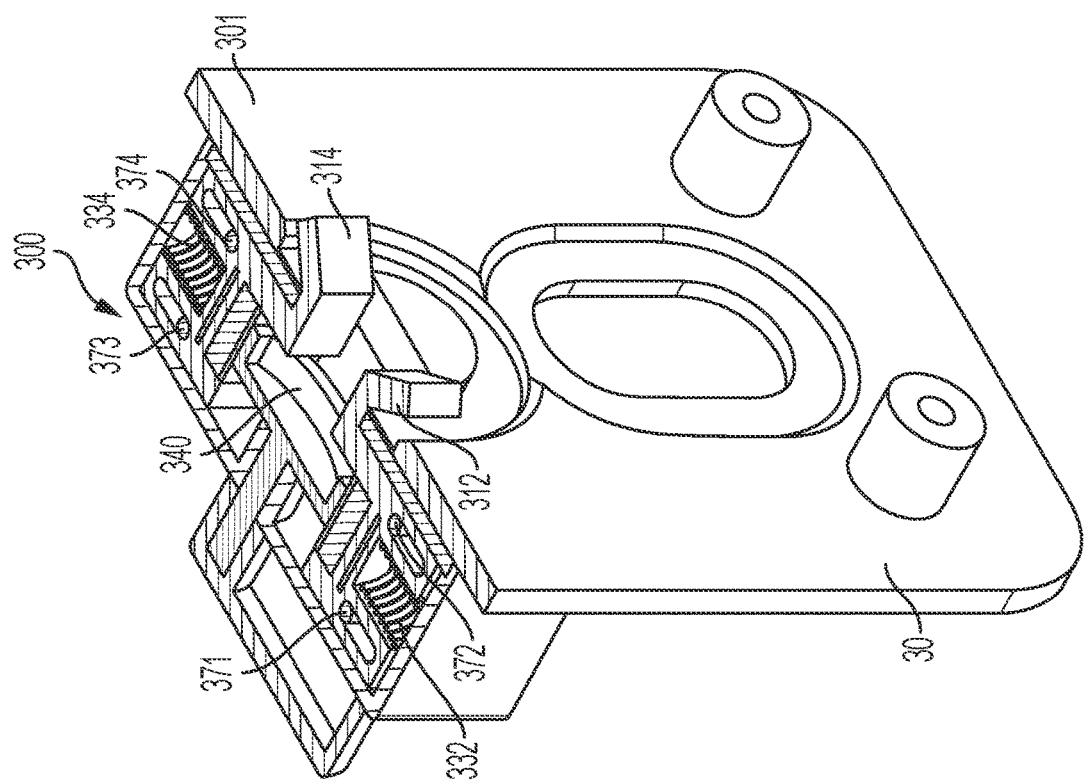
FIG. 12 is a schematic cross-sectional perspective view of the attachment system of FIG. 9 in a locked configuration.
Figure 11:
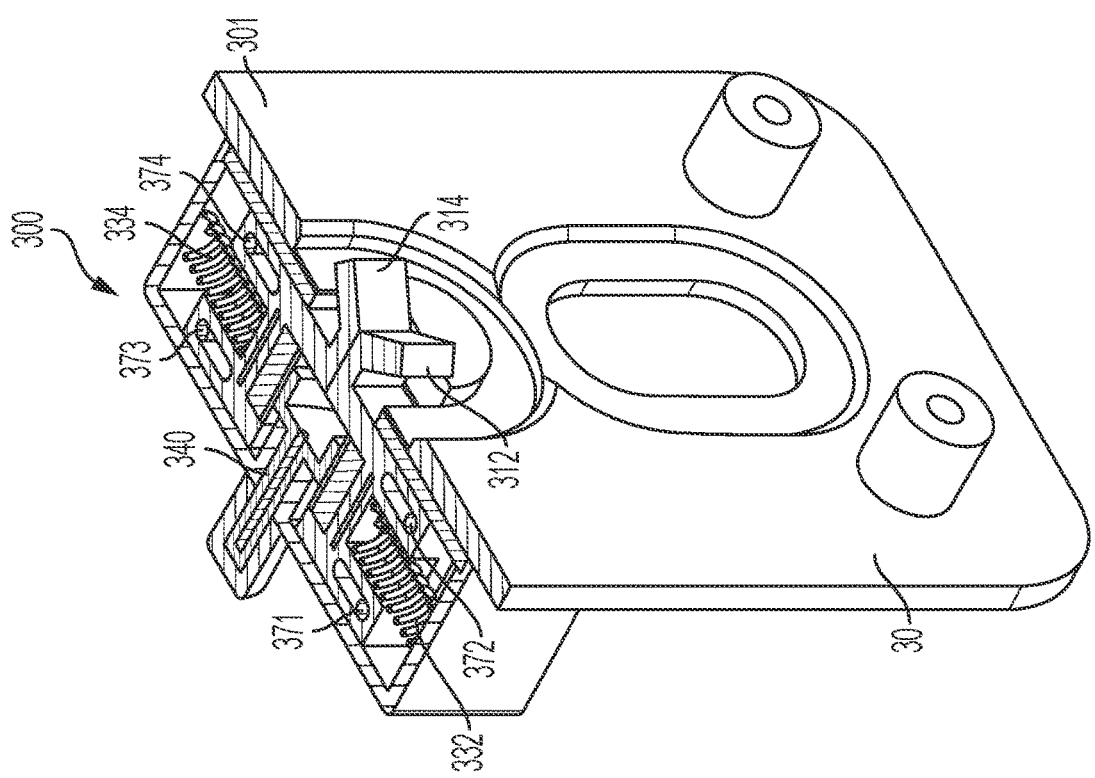
FIG. 11 is a schematic cross-sectional perspective view of the attachment system of FIG. 9 in an unlocked configuration.

With reference now to FIGS. 11 and 12, the attachment mechanism 300 is illustrated in a first, or disengaged, position (FIG. 11) and a second, or engaged, position (FIG. 12). As shown in FIG. 11, the first and second clamping ends 312, 314 do not engage with a surface of the component 30. The first, second, third, and fourth pins 371, 372, 373, 374 are positioned near an outboard edge of the respective slots 363, 365, 366, 369. Rotation of the cam 340 results in engagement of the cam 340 with the pad members 352, 354 to push the first and second clamping ends 312, 314 outward such that the V-shaped members of each of the first and second clamping ends 312, 314 engage with the surface of the component 30, as shown in FIG. 12. In this position, the pins 371, 372, 373, 374 are positioned near an inboard edge of the respective slots 363, 365, 366, 369.

Figure 13:
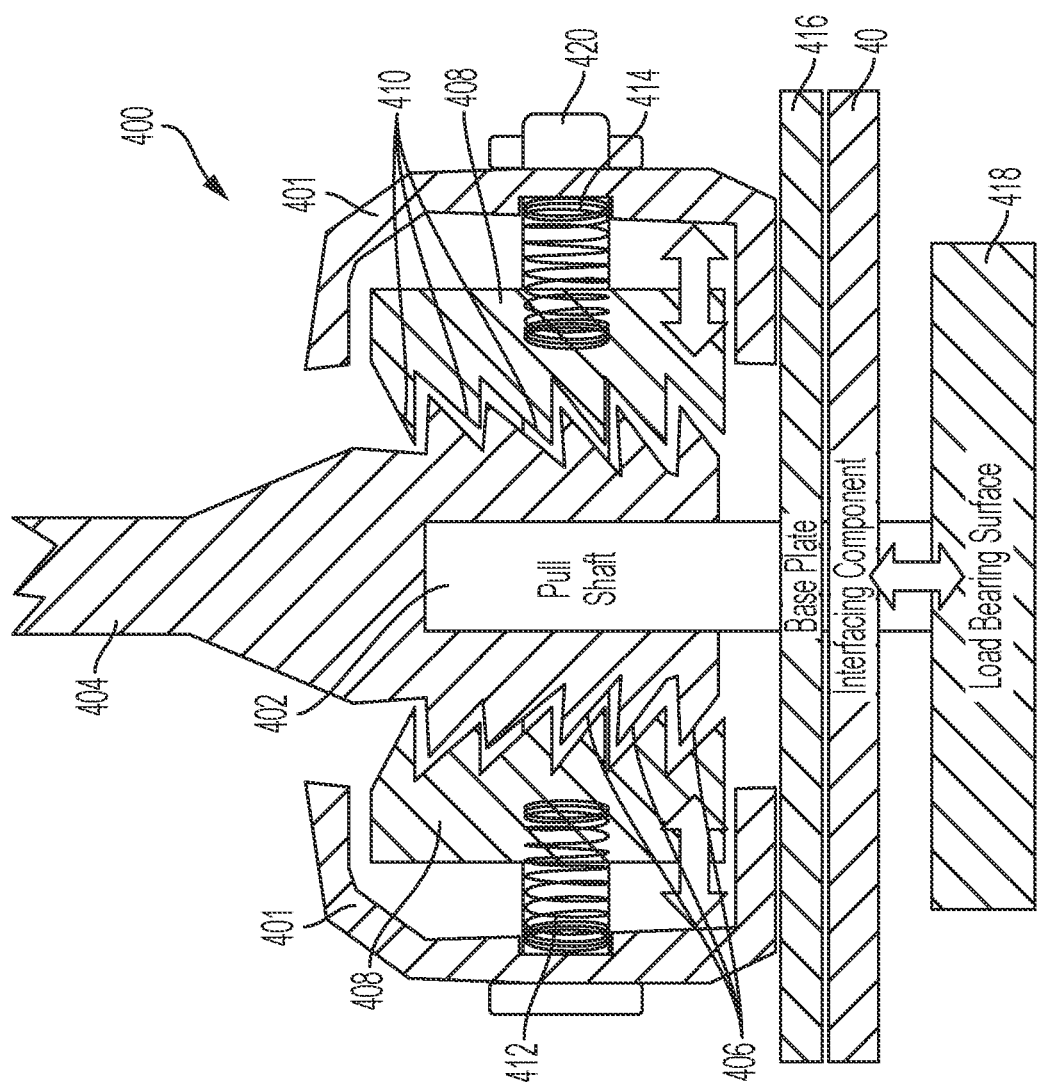
FIG. 13 is a schematic cross-sectional view of an attachment system, according to another embodiment.
Figure 15:
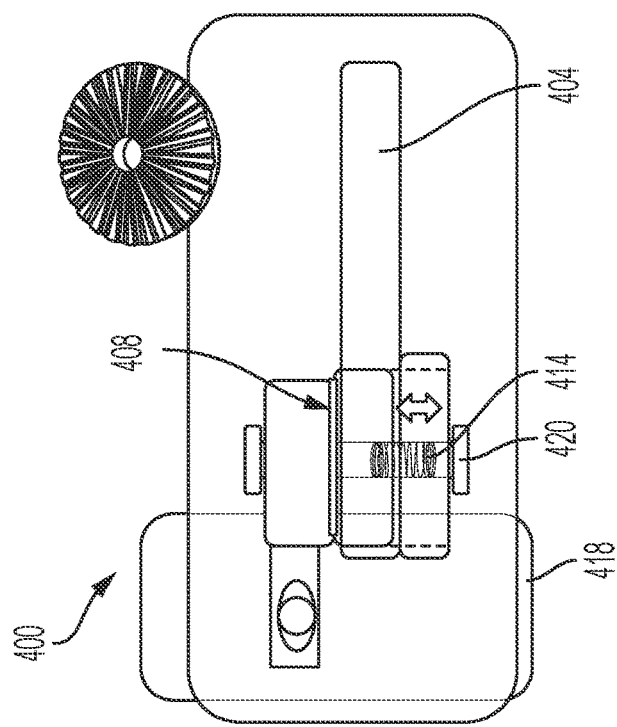
FIG. 15 is a schematic plan view of the attachment system of FIG. 13.
Figure 14:
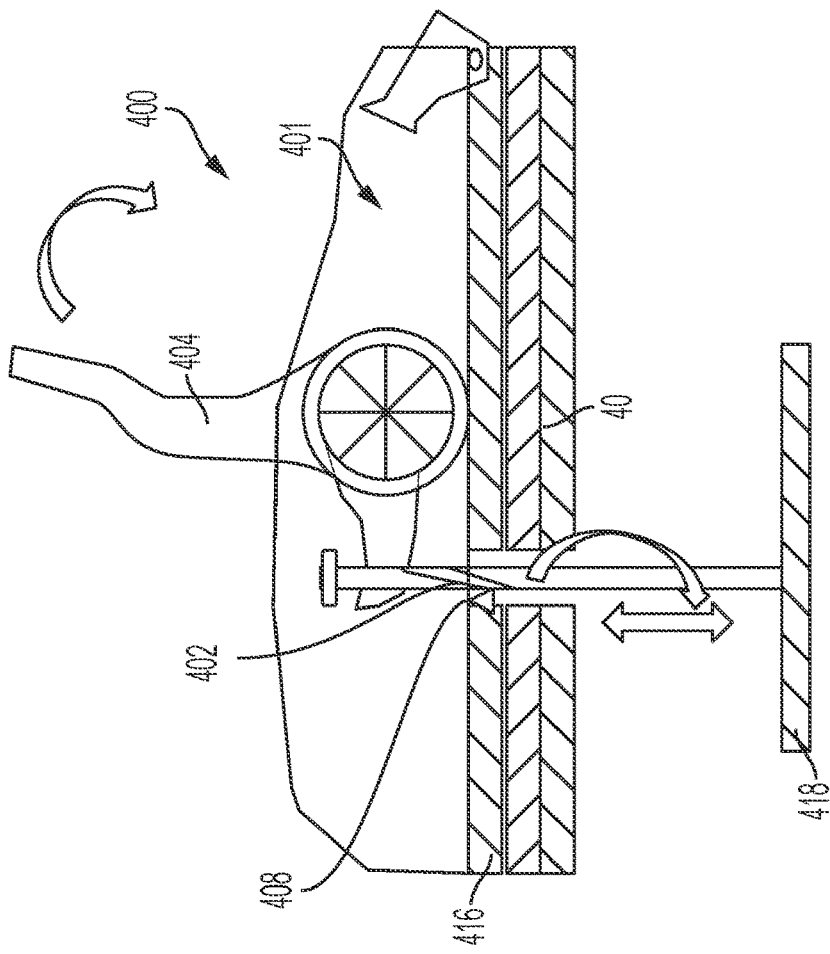
FIG. 14 is a schematic side cross-sectional view of the attachment system of FIG. 13.

Another embodiment of an attachment mechanism 400 is illustrated in FIGS. 13-15. In this embodiment, the attachment mechanism 400 includes a cam lock-style clamp with a ratchet feature to ensure consistent torque regardless of the thickness of the interfacing component. The attachment mechanism 400 includes a housing 401 that encloses a shaft 402 coupled to a crank 404. A plurality of ratchet teeth 406 extend radially outward from the shaft 402. The housing 401 also encloses a torque slide ratchet member 408. The torque slide ratchet member 408 includes a plurality of teeth 410 extending radially inward and toward the ratchet teeth 406. In various embodiments, the torque slide ratchet member 408 is a slip disk or clutch having ratchet teeth 410 that engage with the ratchet teeth 406. The torque slide ratchet member 408 is acted on by two compression members 412, 414. The compression members 412, 414 are, in various embodiments, springs that are preloaded or tensioned such that the spring force acts radially inward to predispose the torque slide ratchet member 408 radially inward toward the shaft 402 and the ratchet teeth 406. In various embodiments, the compression members 412, 414 are tensioned using a tensioning member 420.

A base plate 416 is coupled to the housing 401. The shaft 402 extends through the base plate 416 and is coupled to a load bearing surface 418. Rotation of the crank 404 in a first direction rotates the shaft 402 such that the plurality of ratchet teeth 406 engage with and exert force against the plurality of teeth 410. The torque slide ratchet member 408 translates outward as the compression force exerted by the plurality of ratchet teeth 406 equal the force exerted by the compression members 412, 414. This action allows the load bearing surface 418 to be adjusted upwards (to a clamping position against the interfacing component 40). Rotation of the crank 404 in a second direction opposite the first direction allows the load bearing surface 418 to be adjusted downwards (to a release position) and also allows a handle of the crank 404 to be stored against the housing 401.

FIGS. 14 and 15 illustrate two additional views of the attachment mechanism 400. FIG. 14 illustrates a side cross-sectional view of the attachment mechanism 400. The shaft 402 includes a slot that auto rotates a foot of the shaft 402 into a 90 degree position as the handle is moved to a secure position flush with the housing 401. As shown in FIG. 15, the clamp load of the attachment mechanism 400 may be adjusted using the tensioning member 420. In various embodiments, the tensioning member 420 is a bolt that passes radially through the attachment mechanism 400. Each of the compression members 412, 414 encircles the tensioning member 420 such that tension is added to the compression members 412, 414 through rotation of a nut at a terminal end of the tensioning member 420.

It should be emphasized that many variations and modifications may be made to the herein-described embodiments, the elements of which are to be understood as being; among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term. "alternatively" refers to selection of one of two or more alternatives and is not intended to limit the selection to only those listed alternatives or to only one of the listed alternatives at a time unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An attachment mechanism for an interfacing component, the attachment mechanism comprising:
    a housing;
    a first clamp member having a V-shaped first clamping end;
    a second clamp member having a V-shaped second clamping end;
    an adjustment mechanism configured to adjust a relative position of the first clamp member and the second clamp member, wherein the first and second clamp members are configured to translate toward and away from each other via force exerted by the adjustment mechanism such that the first and second clamping ends translate between an engaged position and a disengaged position; and
    a back plate coupled to the housing and defining an opening, wherein the first clamping end and the second clamping end each extends through the opening in the back plate and the V-shaped first and second clamping ends of the first and second clamp members engage the interfacing component when in the engaged position.

2. The attachment mechanism of claim 1, further comprising a first tapered member, a second tapered member, and a load bearing surface, wherein the first and second tapered members accommodate a varied thickness of the interfacing component and are configured to translate in opposite directions relative to one another and frictionally engage and clamp the interfacing component against the load bearing surface of the attachment mechanism.

3. The attachment mechanism of claim 1, wherein the adjustment mechanism is a pair of preloaded compression members.

4. The attachment mechanism of claim 1, further comprising a linkage assembly, and wherein the adjustment mechanism includes at least one preloaded compression member such that expansion of the linkage assembly against a force of the at least one preloaded compression member expands the first and second clamp members away from each other such that the first and second clamp members engage an interfacing component.

5. The attachment mechanism of claim 4, wherein the linkage assembly is a four-bar linkage that couples together the first and second clamp members.

6. The attachment mechanism of claim 4, further comprising a lever, wherein rotation of the lever in a first direction expands the linkage assembly such that the first and second clamp members are in the engaged position and rotation of the lever in a second direction opposite the first direction contracts the linkage assembly such that the first and second clamp members are in the disengaged position.

7. The attachment mechanism of claim 6, further comprising a latching assembly coupled to the lever via a coupling member, wherein the latching assembly is configured to releasably secure the linkage assembly to position the attachment mechanism between the engaged and the disengaged position.

8. The attachment mechanism of claim 1, further comprising a cam enclosed within the housing and configured to act on the first and second clamp members to position the first and second clamp members in the engaged position with an interfacing component.

9. The attachment mechanism of claim 8, wherein the first clamp member has a first body enclosed within the housing, the first body including a recessed area that receives a first pad member, the second clamp member has a second body enclosed within the housing, the second body including a recessed area that receives a second pad member, and the cam rotates against the first and second pad members to enable smooth rotation of the cam to position the first and second clamping ends between the engaged and disengaged positions.

10. The attachment mechanism of claim 9, wherein the first body includes a first edge that defines a first slot, a second edge that defines a second slot, a first pin configured to translate within the first slot, and a second pin configured to translate within the second slot and wherein the second body includes a third edge that defines a third slot, a fourth edge that defines a fourth slot, a third pin configured to translate within the third slot, and a fourth pin configured to translate within the fourth slot, such that the first, second, third, and fourth pins maintain the position of the first and second bodies within the housing and the first, second, third, and fourth slots are aligned with a direction of movement of the first and second clamping ends and limit a translational movement of the first and second clamping ends.

11. An attachment mechanism, comprising:
    a housing;
    a back plate coupled to the housing and defining an opening therethrough;
    a first clamp member and a second clamp member at least partially enclosed within the housing, the first clamp member having a first clamping end and the second clamp member having a second clamping end; and
    a cam enclosed within the housing, the cam configured to act on the first and second clamp members,
    wherein each of the first clamping end and the second clamping end has an outward-facing V-shape and extends through the opening in the back plate, and the first and second clamp members are configured to translate toward and away from each other via force exerted by the cam such that the outward-facing V-shapes of the first and second clamping ends translate between an engaged position and a disengaged position.

12. The attachment mechanism of claim 11, wherein the first clamp member has a first body enclosed within the housing, the first body including a recessed area that receives a first pad member, the second clamp member has a second body enclosed within the housing, the second body including a recessed area that receives a second pad member, and the cam rotates against the first and second pad members to enable smooth rotation of the cam to position the first and second clamping ends between the engaged and disengaged positions.

13. The attachment mechanism of claim 12, wherein the first body includes a first edge that defines a first slot, a second edge that defines a second slot, a first pin configured to translate within the first slot, a second pin configured to translate within the second slot and wherein the second body includes a third edge that defines a third slot, a fourth edge that defines a fourth slot, a third pin configured to translate within the third slot, and a fourth pin configured to translate within the fourth slot, such that the first, second, third, and fourth pins maintain the position of the first and second bodies within the housing.

14. The attachment mechanism of claim 13, wherein the first, second, third, and fourth slots are aligned with a direction of movement of the first and second clamping ends and limit a translational movement of the first and second clamping ends.

15. The attachment mechanism of claim 11, further including a first tension member and a second tension member, wherein the first and second tension members are preloaded to bias the first and second clamping ends of the first and second clamp members to the disengaged position.

16. An attachment mechanism for an interfacing component, the attachment mechanism comprising:
a first clamp member having a V-shaped first clamping end;
a second clamp member having a V-shaped second clamping end;
a linkage assembly; and
an adjustment mechanism configured to adjust a relative position of the first and second clamp members, wherein the first and second clamp members are configured to translate toward and away from each other via force exerted by the adjustment mechanism such that the first and second clamping ends translate between an engaged position and a disengaged position,
wherein the adjustment mechanism includes a preloaded compression member such that expansion of the linkage assembly against a force of the preloaded compression member moves the first and second clamp members away from each other such that the first and second clamp members engage the interfacing component.

17. The attachment mechanism of claim 16, further comprising:
a housing; and
a back plate coupled to the housing and defining an opening, the first and second clamping ends each extending through the opening in the back plate.

18. The attachment mechanism of claim 16, wherein the preloaded compression member of the adjustment mechanism includes a pair of preloaded compression springs.

19. The attachment mechanism of claim 16, wherein the linkage assembly includes a four-bar linkage that couples together the first and second clamp members.

20. The attachment mechanism of claim 16, further comprising a lever connected to the linkage assembly and configured to rotate in a first direction, whereby the lever expands the linkage assembly such that the first and second clamp members are moved to the engaged position, and rotate in a second direction, whereby the lever contracts the linkage assembly such that the first and second clamp members are moved to the disengaged position.

* * * * *